C. H. Douglas.
Sawing Machine.
Nº 107,346.                    Patented Sep. 13, 1870.
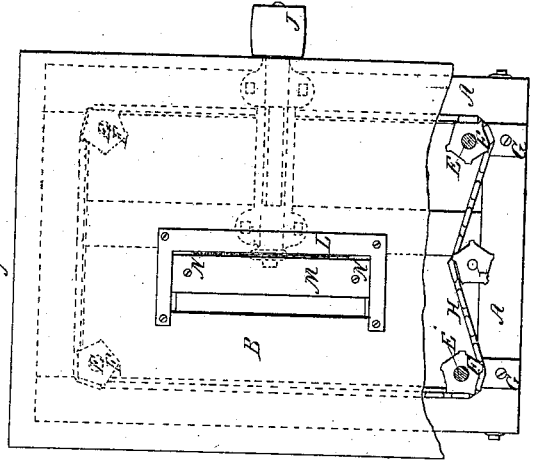
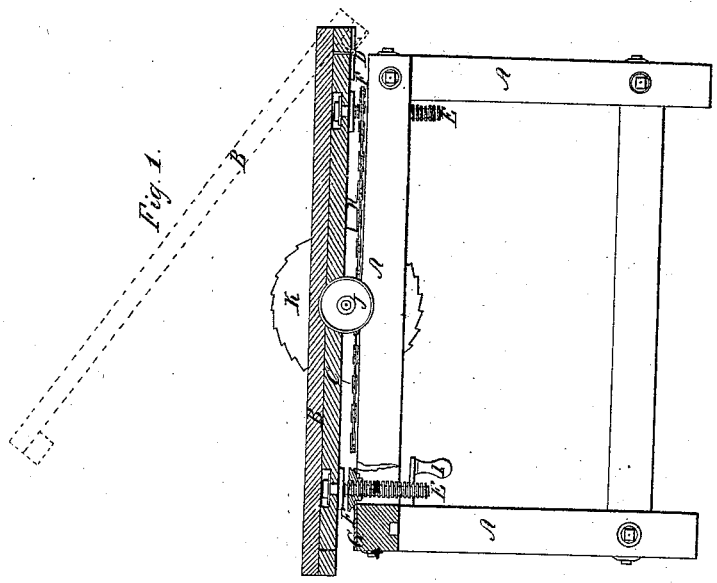
Witnesses;
E. G. Barnard
Geo. D. Livingston
Inventor
Chas. H. Douglas

United States Patent Office.

CHARLES H. DOUGLAS, OF HARTFORD, CONNECTICUT.

Letters Patent No. 107,346, dated September 13, 1870.

IMPROVEMENT IN SAW-TABLES.

The Schedule referred to in these Letters Patent and making part of the same.

To all whom it may concern:

Be it known that I, CHARLES H. DOUGLAS, of Hartford, in the county of Hartford and State of Connecticut, have invented a new and useful Improvement in Buzz-saw Tables; and I do hereby declare that the following is a full, clear, and exact description of the construction and operation of the same, reference being had to the annexed drawings making a part of this specification, in which—

Figure 1 is a longitudinal elevation, and

Figure 2 is a top view of a saw-table embracing my improvements.

A is the frame of the saw-table, and

B is the table-top, hinged to an adjustable frame, C, at D.

E E E E are screws, firmly attached to the frame C at each corner, which extend down through the nuts F F F F.

These nuts revolve in the metal plates G, to which they are loosely attached, and are in the form of sheaves, around which an endless chain, H, passes.

This chain is moved by the sheave and crank I, which causes all four of the nuts F to revolve at the same time.

By this means the frame C and table-top B are raised and lowered, to allow the saw K to extend to a greater or lesser distance through the table, as may be required for the work to be done.

It will be seen that, by this device, the table-top B maintains a level and firm position at any height that it may be placed in relation to the saw.

The nuts F F F F may also be revolved by screws or bevel-gears, but the chain, being more simple and convenient, is preferable.

The table-top B may be raised up on its hinges, as represented by the dotted lines in fig. 1, for the purpose of changing saws, &c.

In fig. 2—

L is a plate, of metal or other convenient material, attached firmly to the table B on one side of the saw, and having an arm on each end, which extends by the saw sufficiently far to allow the plate M, on the opposite side of the saw, to slide back and forth thereon.

N N are set-screws to hold the plate M in any desired place.

Between these two plates the saw is designed to play, and by this device the opening or slot therefor may be enlarged or contracted to suit the thickness of the saw, or may be opened wide enough for a cutter-head of any desired thickness.

The plate M may be made to slide far enough to allow the saws to be taken off or put on the arbor without raising the top B, and the screws E E E E may then be secured directly to the top B, if it should be found desirable to dispense with the intermediate frame C.

The plates or sockets G G G G, in which the sheave-nuts F F F F revolve, are secured to the top of the frame A at each corner, and in such a position that the screws E E E E can conveniently extend down through the said nuts.

The screws E E E E are stationary to the frame C, and project downward at right angles therewith, and serve the double purpose of screws, by which, in combination with nuts F F F F, the table-top B is elevated and depressed equally at all points, and of steady-pins, to hold it firmly in its place at whatever elevation it may be raised.

Three very important results are obtained and combined by this elevating device:

First, the top of the saw-table B is elevated or depressed equally and simultaneously at each corner, and hence it is always level and at right angles with the saw;

Secondly, the table is firm and unyielding at whatever height it may be raised; and Thirdly, it is easily and quickly adjusted to any height desired.

Claims.

I claim as my invention—

1. The combination and arrangement, in a circular-saw table, of the plates or sockets G G G G, sheave-nuts F F F F, endless chain H, screws E E E E, adjustable frame C, and hinged top B, all substantially as and for the purposes hereinbefore specified.

2. The plates or sockets G G G G, nuts F F F F, and screws E E E E, when arranged and operated in combination with each other and the saw-table top B, as and for the purpose specified.

CHAS. H. DOUGLAS.

Witnesses:
E. G. BARNARD,
GEO. D. LIVINGSTON.